US 8,261,273 B2

(12) United States Patent
Narang et al.

(10) Patent No.: US 8,261,273 B2
(45) Date of Patent: Sep. 4, 2012

(54) ASSIGNING THREADS AND DATA OF COMPUTER PROGRAM WITHIN PROCESSOR HAVING HARDWARE LOCALITY GROUPS

(75) Inventors: Ankur Narang, New Delhi (IN); Ravi Kothari, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1037 days.

(21) Appl. No.: 12/202,525

(22) Filed: Sep. 2, 2008

(65) Prior Publication Data

US 2010/0058346 A1 Mar. 4, 2010

(51) Int. Cl.
G06F 9/46 (2006.01)
(52) U.S. Cl. .................... 718/102; 717/156; 717/132
(58) Field of Classification Search .................. None
See application file for complete search history.

(56) References Cited

U.S. PATENT DOCUMENTS

| | | | |
|---|---|---|---|
| 5,418,953 A | 5/1995 | Hunt et al. | |
| 6,289,369 B1 * | 9/2001 | Sundaresan | 718/103 |
| 6,298,451 B1 * | 10/2001 | Lin | 714/4.2 |
| 7,146,607 B2 * | 12/2006 | Nair et al. | 717/151 |
| 7,409,689 B2 * | 8/2008 | Jones et al. | 718/107 |
| 7,461,376 B2 * | 12/2008 | Geye et al. | 718/100 |
| 7,464,380 B1 * | 12/2008 | Hempel | 718/102 |
| 7,627,864 B2 * | 12/2009 | Du et al. | 717/151 |
| 7,765,094 B2 * | 7/2010 | Bodden et al. | 703/22 |
| 2007/0074217 A1 | 3/2007 | Rakvic et al. | |
| 2007/0130568 A1 | 6/2007 | Jung et al. | |
| 2007/0174829 A1 | 7/2007 | Brockmeyer et al. | |

OTHER PUBLICATIONS

Johnson, E.L., etal., Min-cut clustering, 1993, Mathematical programming, North Holland, 133-151.*
Johnson, T.A. etal., Min-cut Program Decomposition for Thread-Level Speculation, 2004 ACM, pp. 59-70.*
P.G. Paulin, "Automatic mapping of parallel applications onto multiprocessor platforms: A multimedia approach," Procs. of EuroMicro on Digital Sys. Design, 2004.
I.S. Dhillon et al., "Information-theoretic co-clustering," Procs. of 9th ACM SIGKDD Int'l Conf on Knowledge Discovery & Data Mining, 2003.
C-W Yeh et al., "A general purpose, multiple-way partitioning algorithm," IEEE Trans. on Computer-Aided Design of Int. Circs. & Sys., Dec. 1994.
G. Karypis et al., "A fast and high quality multilevel scheme for partitioning irregular graphs," Siam J. Sci. Comput., vol. 20. No. 1, 1998.
R. Schultz, "Stochastic integer programming: A tutorial," 9th Int'l Conf. on Stochastic Prog'g, Aug. 2001.

* cited by examiner

*Primary Examiner* — Eric Coleman
(74) *Attorney, Agent, or Firm* — Gibb & Riley, LLC

(57) ABSTRACT

A computer program having threads and data is assigned to a processor having a processor cores and memory organized over hardware locality groups. The computer program is profiled to generate a data thread interaction graph (DTIG) representing the computer program. The threads and the data of the computer program are organized over clusters using the DTIG and based on one or more constraints. The DTIG is displayed to a user, and the user is permitted to modify the constraints such that the threads and the data of the computer program are reorganized over the clusters. Each cluster is mapped onto one of the hardware locality groups. The computer program is regenerated based on the mappings of clusters to hardware locality groups. At run-time, optimizations are performed to improve execution performance, while the computer program is executed.

20 Claims, 4 Drawing Sheets

ASSIGNING THREADS AND DATA OF COMPUTER PROGRAM WITHIN PROCESSOR HAVING HARDWARE LOCALITY GROUPS

FIELD OF THE INVENTION

This disclosure relates generally to processors having multiple processor cores and memory organized over hardware locality groups, and more particularly to assigning threads and data of computer programs within such processors for efficient execution of the computer programs.

BACKGROUND OF THE INVENTION

Processor integrated circuit (IC) manufacturers have shifted from increasing processor clock frequency to increase performance to instead increasing the number of processors within a given IC or chip to increase performance. Currently chips with four or eight processor "cores" are widely available. It is expected that in the future, chips that have tens of processor cores will become available, and possibly hundreds or thousands of processor cores, to increase performance.

Multiple-core processor chips are advantageously employed by computer programs that have multiple threads. Generally and non-restrictively, a multiple threaded-computer program means that multitasking occurs within the program. Multithreading allows multiple streams of execution to take place concurrently within the same computer program. However, while multiple threads of a computer program may be able to be substantially executed independently and in parallel with one another by different cores, this is not always the case all the time. Often different threads may have to have their execution synchronized with one another. Furthermore, they may share the same data.

Assigning the threads of a computer program to processor cores for optimal execution of the computer program has thus proven difficult to achieve without manually programming each computer program for a given multiple-core architecture. Such disadvantages are exacerbated in the relatively typical situation in which different processor cores have access to different memory within a given multiple-core processor chip. In such instance, the cores are heterogeneous, and it can be important to assign different threads to particular cores that may share memory with other particular cores. (Heterogeneous cores can additionally or alternatively have different clock frequencies and micro-architectures.)

SUMMARY OF THE INVENTION

This disclosure relates to assigning threads and data of a computer program within a processor having hardware locality groups. A method for assigning a computer program having threads and data to a processor having processor cores and memory organized over hardware locality groups, according to an embodiment of the invention, performs the following. The computer program is profiled to generate a data thread interaction graph representing the computer program. The threads and the data of the computer program are organized over clusters using the data thread interaction graph and based on one or more constraints. Each cluster encompasses at least one of the threads and some of the data of the computer program. Clustering may be achieved by performing information co-clustering, and/or by solving a multiple-way balanced cut problem, because the multiple-way balanced cut problem can be used to generate all the clusters.

The data thread interaction graph is displayed to the user, and the user is permitted to modify the constraints on which basis the threads and the data of the computer program are organized over the clusters. Where the user does modify the constraints, the thread and the data of the computer program are reorganized over the clusters. Once the user has approved the clustering, each cluster is mapped onto one of the hardware locality groups of the processor by solving a stochastic integer programming problem. As such, at least one of the threads encompassed by each cluster is executed using the processor cores and the memory of the processor encompassed by the hardware locality group to which the cluster has been mapped.

The computer program is then regenerated based on the mapping of each cluster onto one of the hardware locality groups of the processor. At run-time of the computer program, one or more optimizations are performed to improve performance of execution of the computer program. Then, the threads encompassed by each cluster are executed using the processor cores and the memory of the processor encompassed by the hardware locality group to which the cluster in question has been mapped.

A computing system of an embodiment of the invention includes hardware and one or more components implemented within the hardware. The components are to assign a computer program having threads and data to a processor having processor cores and memory organized over hardware locality groups. The components are to perform information co-clustering of the computer program to organize the threads and the data of the computer program over clusters, where each cluster encompasses at least one of the threads and some of the data of the computer program.

An article of manufacture of an embodiment of the invention includes a tangible computer-readable medium, and means in the medium. The tangible computer-readable medium may be a recordable data storage medium, or another type of tangible computer-readable medium. The means in the medium may be software stored on the medium and that can be executed using hardware. The means performs a method for assigning a computer program having threads and data to a processor having processor cores and memory organized over hardware locality groups. Information co-clustering of the computer program is performed to organize the threads and the data of the computer program over clusters. Each cluster encompasses at least one of the threads and some of the data of the computer program. Each cluster is mapped onto one of the hardware locality groups of the processor.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof. These embodiments are described in sufficient detail to enable those skilled in the art to practice the disclosure. Other embodiments may be utilized, and logical, mechanical, and other changes may be made without departing from the spirit or scope of the disclosure. The following detailed description is, therefore, not to be taken in a limiting sense, and the scope of the present invention is defined only by the appended claims.

Figure 1:
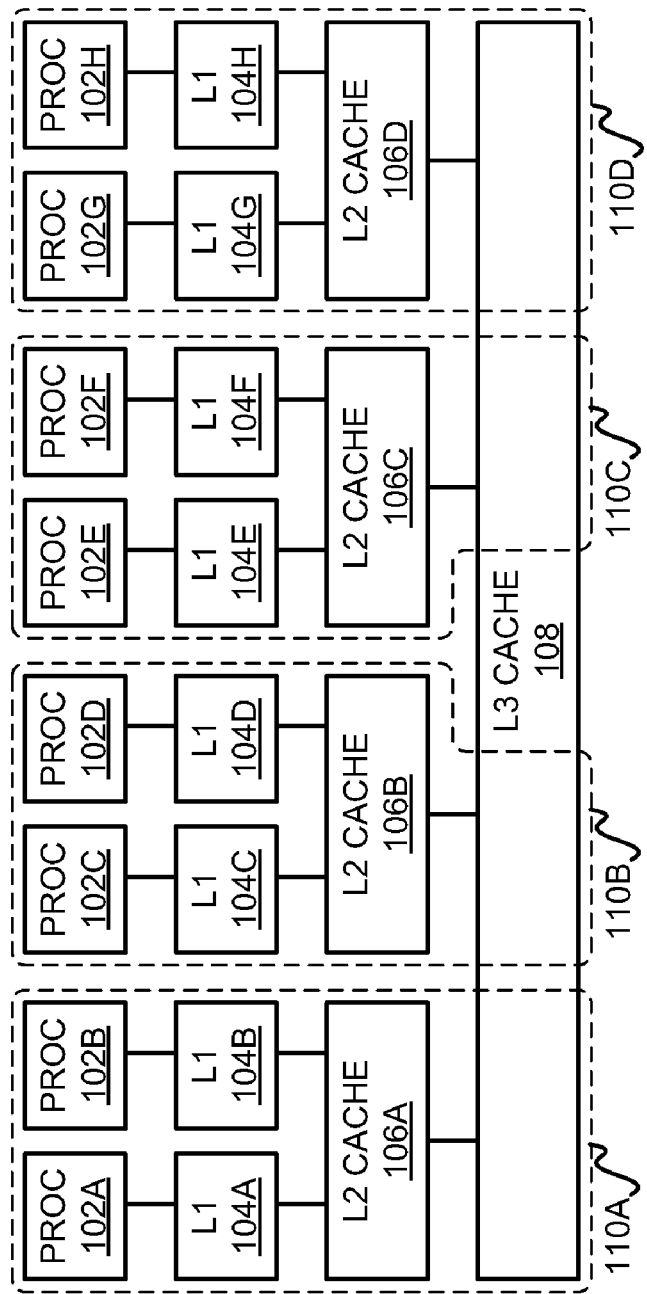
FIG. 1 is a diagram of a multiple-processor core processor, in relation to which embodiments of the invention can be implemented and performed.

FIG. 1 shows a representative multiple-processor core processor 100, in relation to which embodiments of the invention may be implemented and performed. The processor 100 is desirably implemented as a single chip, or integrated circuit (IC), in one embodiment. The processor 100 in FIG. 1 includes eight processor cores 102A, 102B, 102C, 102E, 102E, 102F, 102G, and 102H, collectively referred to as the processor cores 102. However, in other embodiments the processor 100 may have fewer than eight processor cores 102 or more than eight processor cores 102.

The processor cores 102 have corresponding level-one (L1) memory caches 104A, 104B, 104C, 104D, 104E, 104F, 104G, and 104H, collectively referred to as the L1 caches 104. Each L1 cache is specific to a corresponding processor. Thus, the L1 cache 104A is for the processor core 102A and this cache is not shared with any other processor, the L1 cache 104B is for the processor core 102B and is not shared with any other processor, and so on.

Different pairs of the processor core 102, however, share each of the level-two (L2) memory caches 106A, 106B, 106C, and 106D, collectively referred to as the L2 caches 106. For instance, the processor cores 102A and 102B share the L2 cache 106A, the processor cores 102C and 102D share the L2 cache 106B, and so on. Except for the two processors sharing a given L2 cache, no other processor shares this same L2 cache. Finally, all of the processor cores 102 share a level-three (L3) memory cache 108.

Those of ordinary skill in the art can appreciate that variations to the architecture of the multiple-processor core processor 100 are encompassed by this disclosure. For instance, there may be no L3 cache 108 and/or no L1 caches 104. As a further example, more than two processors may share each of the L2 caches 106, and/or a given processor may have access to more than one of the L2 caches 106, in contradistinction to what is depicted in FIG. 1. The caches 104, 106, and 108 may further be memory in addition to and/or other than cache memory.

The processor cores 102 and the memory caches 104, 106, and 108 are organized over a number of hardware locality groups 110A, 110B, 110C, and 110D, collectively referred to as the hardware locality groups 110. While four hardware locality groups 110 are depicted in FIG. 1, there may be more or less than four such groups 110 in other embodiments. Each hardware locality group 110 encompasses hardware that is related to one another. For example, within the hardware locality group 110A, the processor core 102A is related to the L1 cache 104A in that the L1 cache 104A is the L1 cache for the processor core 102A; the same is true for the processor core 102B and the L1 cache 104B. The L2 cache 106A is shared by both the processor cores 102A and 102B, such that the cores 102A and 102B are related to one another and to the L2 cache 106A. While the L3 cache 108 is shared by all the processors 102, for the purposes of division of the processor cores 102 and the memory caches 104, 106, and 108 among the hardware locality groups 110, it is said that a portion of the L3 cache 108 is divided within each hardware locality group 110.

In a further embodiment, the hardware locality groups 110 can be a set of processor cores (with associated memories) of a processor architecture that are interconnected to each other by an interconnection network, such as a mesh, hypercube, hierarchical crossbar, or another type of interconnection network. In still a further embodiment, the hardware locality groups 110 of a processor architecture can be hierarchical locality groups, as typically found in symmetric multiple processor (SMP) systems and distributed memory, among other types of processor architectures.

Figure 2:
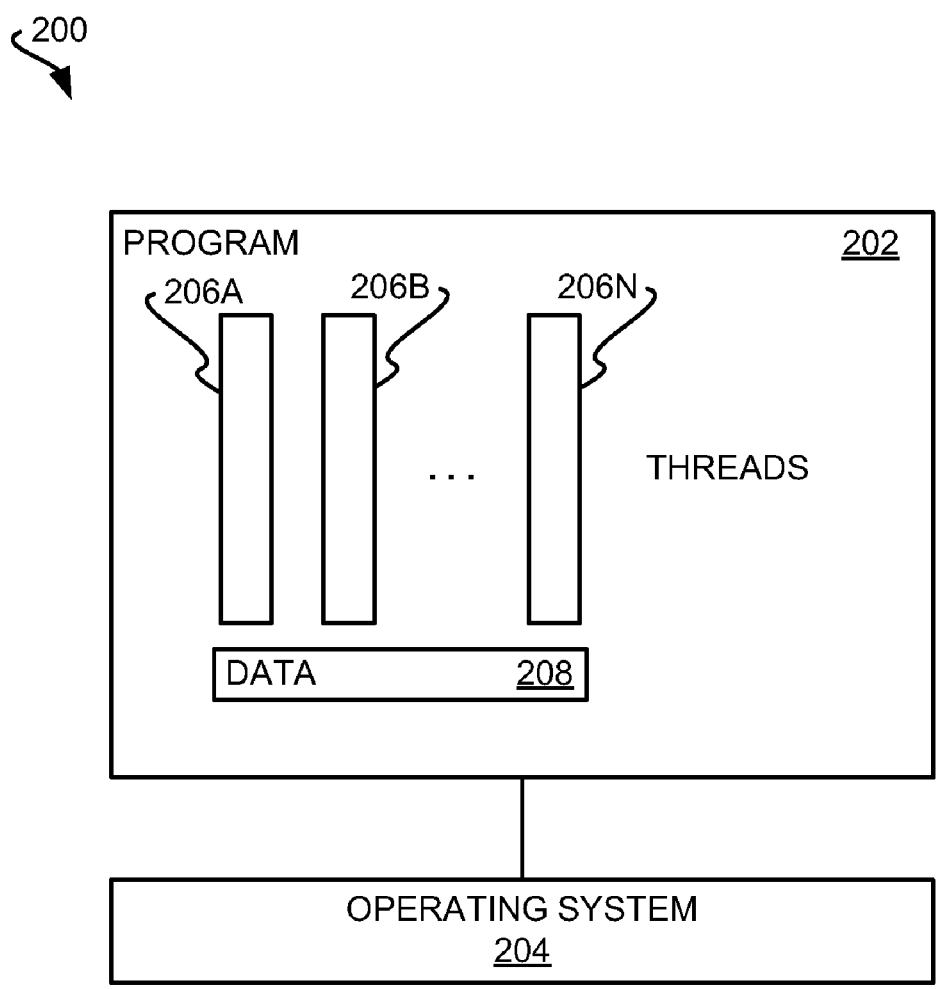
FIG. 2 is a diagram of a software environment, in relation to which embodiments of the invention can be implemented and performed.

FIG. 2 shows a software environment 200 that can be executed by the multiple-processor core processor 100 of FIG. 1, and thus in relation to which the disclosure can be implemented and/or be performed. The software environment 200 includes an application computer program 202 that runs on an operating system 204. The application computer program 202 is a multiple-threaded computer program having threads 206A, 206B, . . . , 206L, collectively referred to as the threads 206. The operating system 204 is an operating system that is capable of supporting multiple such threads. It is noted that the operating system 204 is also a computer program, although those of ordinary skill in the art can appreciate that the operating system 204 is a special type of computer program as compared to the application computer program 202. The computer program 202 is executed in relation to the operating system 204, as can also be appreciated by those of ordinary skill in the art.

Generally and non-restrictively, a multiple-threaded computer program means that multitasking occurs within the program. Multithreading allows multiple streams of execution to take place concurrently within the same computer program. For instance, each of the threads 206 of the application program 202 may be executed by a different processor of the multiple-processor core processor 100 of FIG. 1.

The computer program 202 also includes data 208. The data 208 is used by the threads 206 during execution of the threads 206, and further may be manipulated by the threads 206 during execution of the threads 206. Different parts of the data 208 may be used by different threads 206. As such, the data 208 may be segmented over the different threads 206, where some of the data 208 may be shared by more than one thread 206.

The disclosure is concerned with assigning the computer program 202 to the processor 100 for execution of the computer program 202, and more specifically, concerned with assigning the threads 206 and the data 208 over the hardware locality groups 110 into which the processor cores 102 and the memory caches 104, 106, and 108 have been organized. The goal can be to efficiently assign the threads and the data 208 to the hardware locality groups 110 such that performance of the computer program 202 is optimized.

Figure 3:
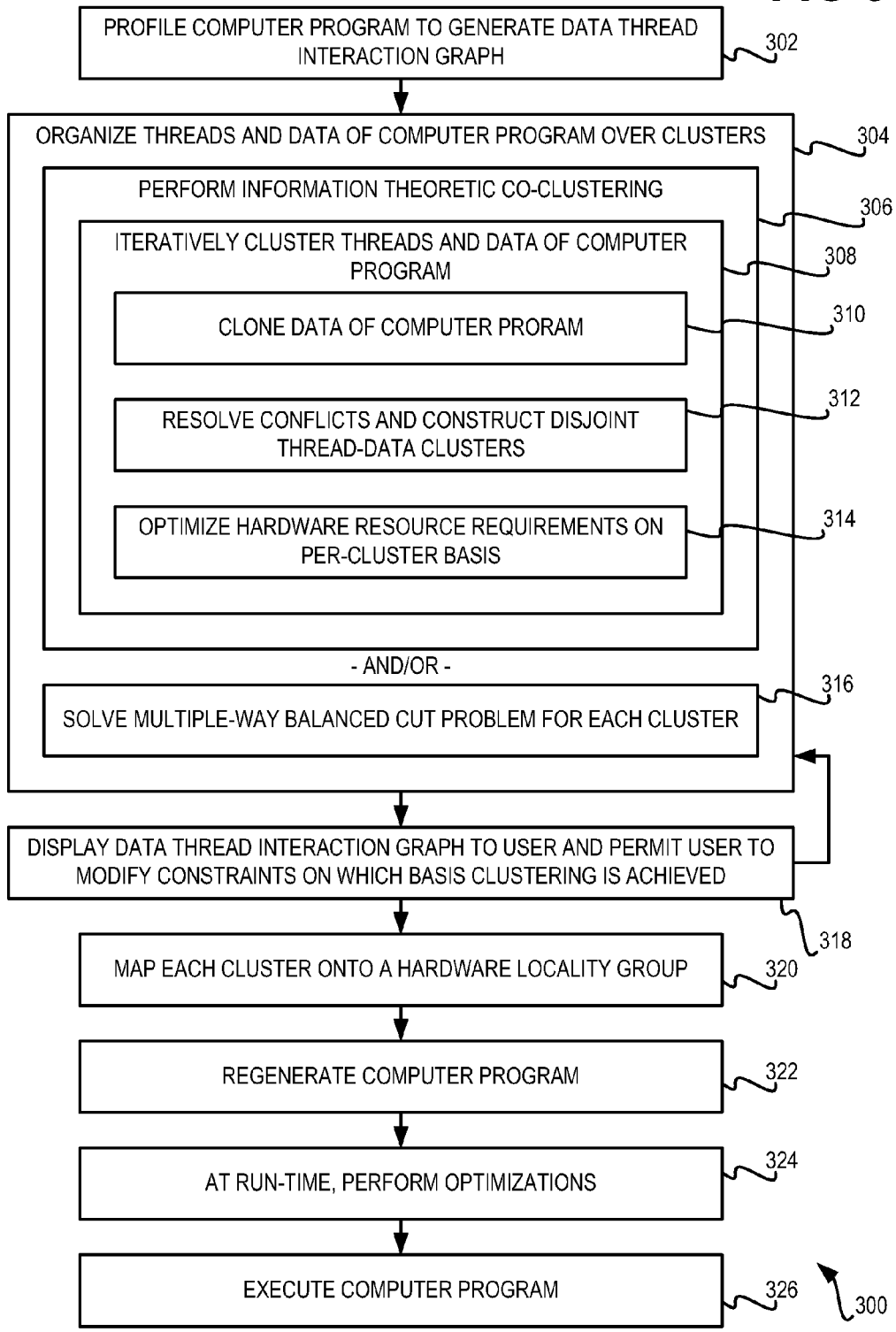
FIG. 3 is a flowchart of a method, according to an embodiment of the invention.

FIG. 3 shows a method 300 for assigning the computer program 202 to the multiple-processor core processor 100, according to this disclosure. At least some parts of the method 300 can be implemented as one or more computer programs stored on a computer-readable medium of an article of manufacture. At least some parts of the method 300 may be performed statically at compile time of the computer program 202, in order to optimize performance at run time of the program 202. By performing the method 300 statically at compile time, that is, there is no delay at run time of the computer program 202 to assign the program 202 to the processor 100. Alternatively, or additionally, at least some parts of the method 300 may be dynamically performed at run time. In the disclosure it may be desirable to optimize accuracy of the assignment of the computer program 202 to the processor 100, while incurring a slight delay to perform the method 300 before the program 202 actually begins execution.

The computer program 202 is profiled to generate or construct a data thread interaction graph (302), as can be appreciated by those of ordinary skill within the art. The graph shows the interactions between the threads 206 of the computer program 202 and the data 208 of the computer program 202. The graph models characteristics of the computer program 202. Such characteristics can include the following. The first characteristic is the frequency of reads and writes from the threads 206 to the data 208, which can control the weights assigned to the edges between nodes of the graph representing the threads 206 and the data 208. The second characteristic is the computational load on each thread 206, which can control the weight assigned to the node representing the thread 206 within the graph.

The third characteristic is the size of each element of the data 208, such as the memory consumed by the data 208 in question. The fourth characteristic is the synchronization between the threads 206, which can control the weights of the edges between nodes representing the threads 206. The fifth characteristic is inter-data affinity, which controls whether there are edges between nodes representing the data 208. That is, similar data 208 have nodes within the graph that are connected to one another via such edges. It is noted that the granularity of the data 208 within the data thread interaction graph is selected based on a tradeoff between mapping time and the quality of the clusters that will be generated. Finer granularity enables higher quality clustering but results in larger mapping time. By comparison, coarser granularity results in lesser quality cluster but results in shorter mapping time.

The threads 206 and data 208 of the computer program 202, as represented within the graph that has been constructed, are organized over a number of clusters (304). Each cluster encompasses at least one of the threads 206 and at least some data 208. Clustering is a tool in unsupervised (i.e., automated) learning that is employed to group together similar items within groups referred to as clusters. Clustering is commonly performed over a single dimension of a set of data, which is referred to as one-way clustering. For example, within a data set organized over a number of rows and columns, single-dimension clustering performs clustering of the data set over the rows or over the columns. By comparison, co-clustering, or simultaneous clustering, uses two or more dimensions of a set of data, and can be referred to as a multiple-way clustering. For example, within a data set organized over a number of rows and columns, multiple-dimension clustering performs clustering of the data set both over the rows and over the columns.

The threads and the data 208 of the computer program 202 are organized over a number of clusters based on one or more constraints. Constrains can be predefined by the user, or automatically generated without user interaction, and are intended to generate higher quality clusters in less time. Typical user-defined constraints may be hard constraints or soft constraints. Hard constraints are constraints that the mapping process has to follow. Hard constraints may be specified by a user, like a programmer, who knows which subsets of threads and data structures should be placed in the same cluster or on the same core and/or memory. Such constraints may also include separation constraints, in which particular threads and/or data should not be placed on the same core and/or memory. Soft constraints, by comparison, are commendations to the mapping process, and should be followed by the mapping process, but can be ignored if found appropriate to do so. Soft constraints can also include thread and/or data groupings to the same core and/or memory, as well as separation constraints.

Clustering may be performed in various embodiments in one or two different ways, each of which is now described in detail. First, information co-clustering can be performed to organize the threads 206 and the data 208 of the computer program 202 over a number of clusters (306). Information co-clustering performs co-clustering as an optimization in information theory. That is, the optimal co-clustering maximizes the mutual information between clustered random variables subject to constraints on the number of row and column clusters. In one embodiment, the information co-clustering can be performed in part 302.

In an embodiment of the invention, multiple dimensions of the threads 206 and the data 208 of the computer program 202 on which basis the threads 206 and the data 208 are clustered are as follows. The first dimension is the interaction between the threads 206 and the data 208. For example, some threads 206 may access and/or manipulate some of the data 208, while other threads 206 may access and/or manipulated other of the data 208, in a shared and/or a mutually exclusive manner. The second dimension is the interaction among the threads 206 themselves. For example, some threads 206 may provide data to and/or receive data from other threads 206, or otherwise interact with these other threads 206.

In an embodiment of the invention, information co-clustering of part 302 is achieved by performing parts 308, 310, 312, and/or 314. In part 308, the threads 206 and the data 208 of the computer program 202 are iteratively clustered until all the threads 206 and all the data 208 have been assigned to the clusters. That is, the clusters as a whole encompass all the threads 206 and all the data 208, and there is neither thread 206 nor any data 208 that is not part of one of the clusters. It is noted that iterative clustering does not necessarily mean that the clusters are formed one by one. Rather, in iterative clustering, such clustering occurs in iterations, but clusters are expanded or are modified concurrently in information clustering in particular.

To achieve such iterative clustering, in one embodiment parts 310, 312, and/or 314 are performed. First, read-only data of the data 208 of the computer program 202 may be cloned to minimize execution time of the threads 206 while constrained by the amount of the memory of the processor 100 (e.g., the caches 104, 106, and 108) (310). Such cloning minimizes execution time by reducing the cost of communication done by the thread to access remote data, because once the data has been cloned onto the same cluster as the thread, the communication cost becomes smaller, if not negligible. Read-only data encompasses any data that the threads 206 as a whole only reads and never updates or writes. So that otherwise disparate threads 206 that read such read-only data do not have to be clustered within the same cluster, such read-only data is cloned to permit such threads 206 to be clustered within different clusters, which can result in optimizing execution of the computer program 202. However, cloning such read-only data over different clusters is constrained by the total amount of memory available within the processor 100. If insufficient memory is available to permit such cloning, then only the most frequently accessed read-only data, for instance, may be cloned. Read-write data can also be cloned, but the degree of cloning is controlled to reduce the overhead associated with maintaining the consistency and/or coherency of such data.

Second, conflicts are resolved while clustering the threads 206 and the data 208, and disjoint thread-data clusters are constructed (312). As a simple example considering only the threads 206 and not the data 208, there may be four threads A, B, C, and D, where threads A, B, and C are related to one another, and threads B and D are related to each other. There is a conflict in that thread B can be clustered with either both threads A and C or with just thread D. However, threads A and C, while related to thread B, are not related to thread D. Therefore, threads A and C are clustered in one cluster, and threads B and D are clustered in another cluster. The end result is that disjoint clusters are constructed, in that the cluster of threads A and C is disjoint with the cluster of threads B and D, in that the threads of the former cluster are mutually exclusive with the threads of the latter cluster.

Third, the hardware resource requirements for each cluster are optimized on a per-cluster basis such that overall execution time of the computer program 202 is minimized (314). That is, once the threads 206 and the data 208 of the computer program 202 have been clustered over a number of different clusters, each cluster is analyzed in detail to attempt to minimize the hardware resource requirements of the threads 206 and the data 208 assigned to the cluster, while attempting to minimize overall execution time of the computer program 202 as a whole. As a simple example considering only the threads 206 and not the data 208, two threads may be assigned to a given cluster. For maximum performance, the threads may desirably be executed on different processor cores. However, analysis of the threads may reveal that the threads are heavily dependent on each other, such that parallel execution of the threads on different cores is unlikely to occur most of the time. Therefore, the hardware resource requirements of the threads may be consolidated to a single processor core, with a nearly negligible impact on overall execution time of the computer program 202 as a whole.

The second way clustering can be performed, either in addition to or in the alternative to the information co-clustering of part 306, is for each cluster and on a per-cluster basis, to solve a multiple-way balanced cut problem to minimize overall execution time of the computer program (316). The multiple-way balanced cut problem, or the min-cut problem, is aimed at finding a partition (or cluster) of the vertices of a graph into multiple groups, by cutting the minimum number of edges, where each partition (or cluster) has the same number of vertices. The problem is a "cut" problem in that the graph vertices are partitioned, or "cut." The problem is a balanced "cut" problem in that the each cluster has the same computational load and/or similar memory requirement. The problem is a multiple-way problem in that the number of partitions can be more than two, which differentiates a multiple-way problem from a simpler two-way problem.

Performing the multiple-way balanced cut problem for each cluster on a per-cluster basis allows for the threads 206 and the data 208 assigned to a given cluster to be removed from that cluster and assigned to another cluster. As such, the end result is that the clusters are desirably balanced. In one embodiment, solving the multiple-way balanced cut problem may be achieved.

Partitioning the data-thread interaction graph among clusters, or partitioning a hyper-graph among clusters, can in one embodiment be performed in accordance with the METIS family of partitioning programs. The METIS family of programs is for partitioning unstructured graphs and hyper-graphs and also for computing fill-reducing orderings of sparse matrices.

In one embodiment, for each cluster and on a per-cluster basis, the threads 206 and data structure elements of the data 208 of the computer program 202 within a given cluster can be assigned to this cluster in a detailed manner. For example, where a cluster is to correspond to a give hardware locality group 110 of the processor 100, the threads 206 of the cluster may be assigned to given processor cores 102 within the group, and the data structure elements of the data 208 of the cluster may be assigned to given memory within the group, such as to given memory caches 104, 106, and 108 within the group. Such detailed assignment of the threads 206 and the data 208 within a given cluster to particular hardware elements (i.e., processor cores and memory) of a given hardware locality group 110 is achieved to maximize performance of the program 202 as a whole.

Once the initial clustering of the threads 206 and the data 208 of the computer program 202 has been accomplished, the data thread interaction graph of the computer program 202 is displayed to the user (318). The graph is displayed such that the clustering of the threads 206 and the data 208 is superimposed and/or is part of the graph itself. The graph thus shows the interactions between the threads 206 of the computer program 202 and the data 208 of the computer program 202, as well as their clustering.

The benefit for the end user is that the user is able to gain an understanding in the clustering decisions made by the method 300, since the clustering is based on the interactions between the threads 206 and the data 208. The user is permitted to influence or control the graph, and in this way be permitted to influence or control the ultimate clustering of the threads 206 and the data 208 over the different clusters. That is, the user is permitted to modify the constraints on which basis clustering is achieved. If the user does modify these constraints, then clustering is again performed, and the method 300 is repeated at part 300. Otherwise, once the user has approved the clustering, the method 300 proceeds from part 318 to part 320.

Once the threads 206 and the data 208 of the computer program 202 have been clustered, then, the method 300 maps each cluster onto one of the hardware locality groups 110 (320). The hardware locality groups 110 may be statically predefined, such that each cluster is mapped onto an already predefined hardware locality group 110 that best matches the hardware requirements of the threads 206 and the data 208 of that cluster. In a further embodiment, however, the hardware locality groups 110 may be dynamically defined. As such, after the clusters have been defined, the processor cores 102 and the memory of the processor 100 (e.g., the memory caches 104, 106, and 108) only then may be grouped into different hardware locality groups 110 that best correspond to the already defined clusters, to achieve maximum performance of the computer program 202. That is, in the former case, the hardware locality groups 110 are predefined before the clustering of part 302 occurs, whereas in the latter case, the hardware locality groups 110 are defined after the clustering of part 302 (and based on such clustering).

A stochastic integer programming problem, which may also be referred to as a stochastic integer program, may be used to solve the placement problem—that is, which clusters should be placed on which hardware locality groups. The stochastic integer program, however, may also be employed to solve the detailed placement problem of mapping the elements of clusters (e.g., the threads and the data of the clusters) to elements of hardware locality groups. This may be needed where the hardware locality groups themselves have complex micro-architectures, such as including multiple cores and multiple levels of caches and/or other types of memories.

Thus, in one embodiment, the stochastic integer programming problem is solved for each cluster and on a per-cluster basis, to achieve this mapping. Such solving accommodates parallel phases of the computer program 202 resulting from conditional branches within the computer program 202, as can be appreciated by those of ordinary skill within the art. That is, conditional branches within a computer program, such as CASE instructions and IF-THEN instructions, means that a given execution instance of the program 202 may not be exactly the same as other execution instances of the program 202. As such, the computer program 202 can execute in different phases, resulting in a number of what are referred to herein as parallel phases that are to be accommodated and taken into account when assigning threads 206 and data 208 of the program 202 to different clusters.

A stochastic integer programming problem is an optimization problem that has random parameters based on a given stochastic integral variable. More generally, stochastic programming is a framework for modeling optimization problems that involve uncertainty. An example of such a framework is a two-stage linear program, in which action is taken in a first stage, after which a random event occurs after the outcome of the first-stage decision. Therefore, a recourse decision can be made in the second stage that compensates for any deleterious effects that might have been experienced as a result of the first-stage decision. Solution approaches to stochastic programming models are driven by the type of probability distributions governing the random parameters. Stochastic integer programming problems are specifically stochastic programming models where the decision variables are required to take on integer values.

Embodiments of the invention are not limited by the manner by which the stochastic integer programming problem can be solved for each cluster to accommodate parallel phases of the computer program 202 resulting from conditional branches within the program 202. In such instance, the decision variable is the path taken from a given conditional branch within the computer program 202.

Once the clusters of the threads 206 and the data 208 of the computer program 202 have been mapped to the hardware locality groups 110, the computer program 202 is regenerated (322). For instance, the computer program 202 may be recompiled based on the information as to how the threads 206 and the data 208 of the program 202 have been clustered and mapped to the hardware locality groups 110. Thus, parts 302 through part 322 are performed statically, at compile-time of the computer program 202, and prior to execution of the computer program 202.

Thereafter, at run-time, one or more optimizations may be performed to further enhance performance of execution of the computer program 202 (324). For instance, the mapping of the threads 206 and the data 208 of the computer program 202 to the hardware locality groups 110 may be slightly modified based on the actual conditions of execution. Such optimizations can include run-time thread migration as well as data migration.

For example, a parallel computer program may have multiple parallel phases. For the first parallel phase, the initial (previously determined) mapping may work well, but for the next parallel phase, the mapping may not be as optimal. For example, the data may need to be placed different within the next parallel phase. In such instance, a decision can be made at and/or during run-time to migrate the data across the cores before this phase, to obtain higher performance during this phase. How to migrate the data across the phases may be decided based on static and/or dynamic mapping optimization analyses.

It is also noted that the parallel phases of a parallel computer program can be independently analyzed for optimal mapping, and appropriate migration achieved at run-time. Alternatively, the thread and/or data migration cost that is added to the overall program execution time may be considered in generating an optimal mapping. This may be achieved iteratively, by starting with individual phase mappings, followed by finding the migration costs, and then in the next iteration changing the mappings per phase to reduce the overall estimated execution time. In this and other ways, then, the optimizations performed at run-time of the computer program migrate one or more of the threads and/or data across (i.e., between) the hardware locality groups to accommodate parallel phases of a computer program.

Thereafter and/or concurrently, the threads 206 of each cluster are executed using the processor cores 102 and the memory of the processor 100 encompassed by the hardware locality group 110 to which the cluster has been mapped (326). That is, the computer program 202 is executed. The data 208 of the computer program 202 of each cluster may be preloaded onto the memory of the hardware locality group 110 to which the cluster corresponds. Thereafter, the threads 206 of each cluster are executed using the processor cores 102 and the memory of the hardware locality group 110 to which the cluster corresponds. In this manner, efficient execution of the computer program 202 results, where the clustering of part 302 can be performed in an automated manner without user interaction in one embodiment, except where such user interaction is desired, as in part 318 of the method 300 as has been described.

Figure 4:
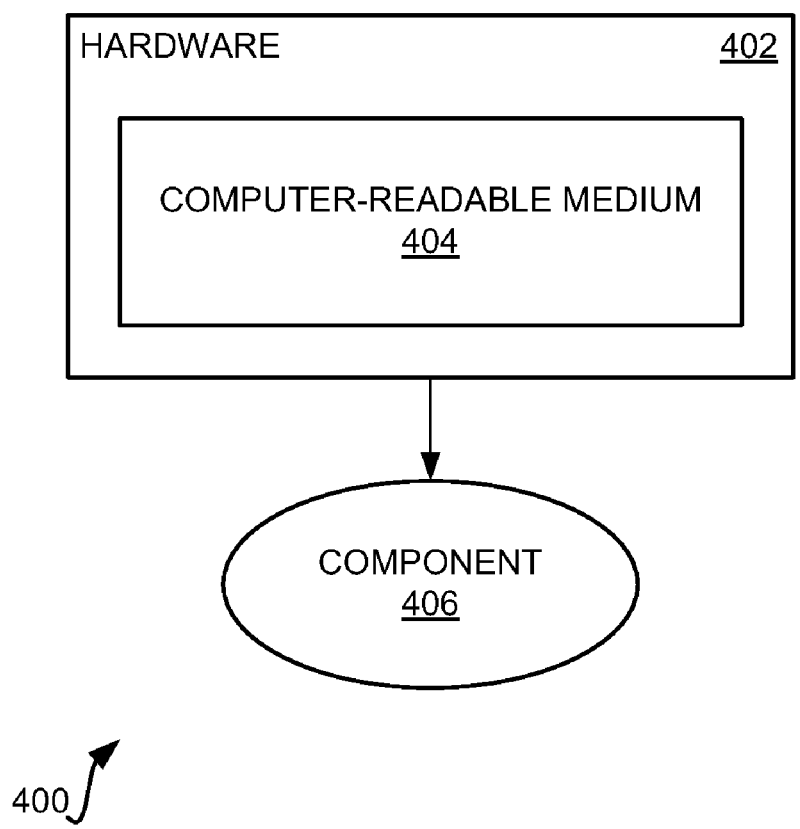
FIG. 4 is a diagram of a system, according to an embodiment of the invention.

FIG. 4 shows a representative rudimentary computing system 400, according to an embodiment of the invention. The computing system 400 includes hardware 402, such as a tangible computer-readable medium 404 like a recordable data storage medium. Examples of recordable data storage media include hard disk drives and semiconductor memories, for instance. A component 406 is implemented via the hardware 402. For instance, in one embodiment the component 406 includes one or more computer programs that are stored on the tangible computer-readable medium 404, where these programs are executed by one or more processors. The component 406 can be considered the means that implements the functionality performed by the component 406.

The component 406 can be a mapping tool that performs the mapping or assignment of threads 206 and data 208 of the computer program 202 to the hardware locality groups 110 of the processor 100, as implemented by the method 300. As such, the component 406 can perform at least some parts of the method 300, such as parts 302 and 320. In general, the component 406 may provide feedback to a user via a thread-data interaction graph and/or graph-based inference. Threads 206 and data 208 with higher interaction are placed onto the same hardware locality group 110. Co-clustering is used to infer locality behavior of the threads 206 and the data 208.

The automated mapping performed by the component 406 (e.g., when executing the method 300) can use workload characteristics as parameters. A workload is generally defined as any arbitrary grouping of one or more processes, such as the processes of the computer program 202. A workload is particularly defined in one embodiment as encompassing those processes that are associated with a particular workflow. In one embodiment, a workflow is a representation of business logic, such that the implementation of the business logic by process(es) of computer program(s) achieves realization of the business logic. A workload in this embodiment is the collection of processes that implement the business logic of a corresponding workflow.

In a further embodiment, the workload is particularly defined as a collection of processes that satisfy a particular policy. One example of a policy specifies all processes associated with a given computer program or given computer programs, such as the computer program 202. A second example of a policy specifies all processes associated with a particular workflow, in accordance with the definition of a workload in the previous paragraph. A process as used herein may be generally defined as an execution instance of a computer program or of a part of a computer program. A process can include and/or correspond to one or more threads, such as the threads 206 of the computer program 202.

Objective functions that can act as the parameters of the automated mapping performed by the component 406 include the minimum mean memory access time over all the threads 206, as well as the minimum average number of remote references per thread 206. A remote reference within a thread is a reference to code outside the thread. A further objective function that can act as a parameter of the automated mapping performed by the component 406 is minimum execution time of the computer program 202 as a whole. Factors that can be taken into account in satisfying minimum execution time include load-balancing across the processor cores 102 and the memory of the processor 101, as well as synchronization cost in synchronizing the threads 206. Furthermore, constraints that can act as parameters of the automated mapping performed by the component 406 include the amount of memory available per hardware locality group 110 (or per processor core 102), as well as the amount of computational resources available per hardware locality group 110 (or per processor core 102).

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

We claim:

1. A method for assigning a computer program having a plurality of threads and data to a processor having a plurality of processor cores and memory organized over a plurality of hardware locality groups, comprising:

profiling the computer program to generate a data thread interaction graph representing the computer program, the graph showing interactions between the threads of the computer program and the data of the computer program;

organizing the threads and the data of the computer program over a plurality of clusters using the data thread interaction graph and based on one or more constraints, the constraints comprising user-defined constraints and automatically generated constraints, each cluster encompassing at least one of the threads and some of the data of the computer program;

displaying the data thread interaction graph to a user and permitting the user to modify the constraints on which basis the threads and the data of the computer program are organized over the clusters, such that where the user modifies the constraints, the threads and the data of the computer program are reorganized over the clusters;

mapping each cluster onto one of the hardware locality groups of the processor by solving a stochastic integer programming problem, such that the at least one of the threads encompassed by the cluster are executed using the processor cores and the memory of the processor encompassed by the one of the hardware locality groups to which the cluster has been mapped;

regenerating the computer program based on the mapping of each cluster onto one of the hardware locality groups of the processor;

at run-time of the computer program, performing one or more optimizations to improve performance of execution of the computer program; and, executing the at least one of the threads encompassed by each cluster using the processor cores and the memory of the processor encompassed by the one of the hardware locality groups to which the cluster has been mapped.

2. The method of claim 1, the organizing of the threads and the data of the computer program further comprising performing information co-clustering of the computer program.

3. The method of claim 2, the information co-clustering of the computer program comprising performing the information co-clustering based on interaction between the threads and the data.

4. The method of claim 2, the information co-clustering of the computer program comprising performing the information co-clustering based on interaction among the threads.

5. The method of claim 2, the information co-clustering of the computer program comprising iteratively clustering the threads and the data of the computer program over the plurality of clusters until all the threads and all the data of the computer program have been assigned to the clusters.

6. The method of claim 5, the iteratively clustering of the threads and the data of the computer program over the plurality of clusters comprising cloning read-only data of the data of the computer program to minimize execution time of the threads while constrained by an amount of the memory of the processor.

7. The method of claim 5, the iteratively clustering of the threads and the data of the computer program over the plurality of clusters comprising resolving conflicts while the threads and the data are being clustered and comprising constructing disjoint thread-data clusters.

8. The method of claim 5, the iteratively clustering of the threads and the data of the computer program over the plurality of clusters comprising optimizing hardware resource requirements on a per-cluster basis such that overall execution time of the computer program is minimized.

9. The method of claim 1, the organizing of the threads and the data of the computer program comprising solving a multiple-way balanced cut problem for each cluster such that overall execution time of the computer program is minimized.

10. The method of claim 1, the mapping of each cluster onto one of the hardware locality groups of the processor by solving a stochastic integer programming problem accommodating parallel phases of the computer program resulting from conditional branches within the computer program.

11. The method of claim 1, the organizing of the threads and the data of the computer program over the clusters and mapping each cluster onto one of the hardware locality groups being statically performed at compile time of the computer program to optimize performance at run time of the computer program.

12. The method of claim 1, the performing of the optimizations at run-time of the computer program migrating at least one of the threads and/or the data across the hardware locality groups to accommodate a plurality of parallel phases of the computer program.

13. A computing system comprising:
- a processor having a plurality of processor cores and memory organized over a plurality of hardware locality groups; and
- a non-volatile computer-usable data storage medium storing instructions that, when executed by a computer, cause the computer to perform a method for assigning a computer program having a plurality of threads and data to the processor and memory, the method comprising:
  - profiling the computer program to generate a data thread interaction graph representing the computer program, the graph showing interactions between the threads of the computer program and the data of the computer program;
  - performing information co-clustering of the computer program to organize the threads and the data of the computer program over a plurality of clusters using the data thread interaction graph and based on one or more constraints, the constraints comprising user-defined constraints and automatically generated constraints, each cluster encompassing at least one of the threads and some of the data of the computer program;
  - displaying the data thread interaction graph to a user and permitting the user to modify the constraints on which basis the threads and the data of the computer program are organized over the clusters, such that where the user modifies the constraints, the threads and the data of the computer program are reorganized over the clusters;
  - mapping each cluster onto one of the hardware locality groups of the processor, such that the at least one of the threads encompassed by the cluster are executed using the processor cores and the memory of the processor encompassed by the one of the hardware locality groups to which the cluster has been mapped; and
  - regenerating the computer program based on the mapping of each cluster onto one of the hardware locality groups of the processor.

14. The computing system of claim 13, the method further comprising performing information co-clustering based on one or more of:
- interaction between the threads and the data of the computer program; and
- interaction among the threads of the computer program.

15. The computing system of claim 13, the method further comprising performing information co-clustering by iteratively clustering the threads and the data of the computer program over the plurality of clusters until all the threads and all the data of the computer program have been assigned to the clusters.

16. The computing system of claim 13, the method further comprising solving a multiple-way balanced cut program for each cluster such that overall execution time of the computer program is minimized.

17. The computing system of claim 13, the method further comprising solving a stochastic integer programming problem to accommodate parallel phases of the computer program resulting from conditional branches within the computer program.

18. An article of manufacture comprising:
- a non-volatile computer-readable medium storing instructions that, when executed by a computer, cause the computer to perform a method for assigning a computer program having a plurality of threads and data to a processor having a plurality of processor cores and memory organized over a plurality of hardware locality groups, the method comprising:
  - profiling the computer program to generate a data thread interaction graph representing the computer program, the graph showing interactions between the threads of the computer program and the data of the computer program;
  - performing information co-clustering of the computer program to organize the threads and the data of the computer program over a plurality of clusters using the data thread interaction graph and based on one or more constraints, the constraints comprising user-defined constraints and automatically generated constraints, each cluster encompassing at least one of the threads and some of the data of the computer program;
  - displaying the data thread interaction graph to a user and permitting the user to modify the constraints on which basis the threads and the data of the computer program are organized over the clusters, such that where the user modifies the constraints, the threads and the data of the computer program are reorganized over the clusters;
  - mapping each cluster onto one of the hardware locality groups of the processor, such that the at least one of the threads encompassed by the cluster are executed using the processor cores and the memory of the processor encompassed by the one of the hardware locality groups to which the cluster has been mapped; and
  - regenerating the computer program based on the mapping of each cluster onto one of the hardware locality groups of the processor.

19. The article of manufacture of claim 18, the method further comprising solving a multiple-way balanced cut program for each cluster such that overall execution time of the computer program is minimized.

20. The article of manufacture of claim 18, the method further comprising solving a stochastic integer programming problem to accommodate parallel phases of the computer program resulting from conditional branches within the computer program.

* * * * *